(12) United States Patent
Fowler

(10) Patent No.: US 10,921,765 B2
(45) Date of Patent: Feb. 16, 2021

(54) DIGITAL TWIN OF CENTRIFUGAL PUMP IN PUMPING SYSTEMS

(71) Applicant: Siemens Aktiengesellschaft, Munich (DE)

(72) Inventor: Edward A. Fowler, Houston, TX (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 184 days.

(21) Appl. No.: 15/849,029

(22) Filed: Dec. 20, 2017

(65) Prior Publication Data
US 2019/0187640 A1    Jun. 20, 2019

(51) Int. Cl.
| G05B 17/00 | (2006.01) |
| F04D 15/00 | (2006.01) |
| F04D 27/00 | (2006.01) |
| F04B 49/06 | (2006.01) |
| G05B 13/04 | (2006.01) |

(52) U.S. Cl.
CPC ............ *G05B 17/00* (2013.01); *F04B 49/065* (2013.01); *F04D 15/00* (2013.01); *F04D 15/0066* (2013.01); *F04D 15/0088* (2013.01); *F04D 27/001* (2013.01); *G05B 13/04* (2013.01); *G05B 13/042* (2013.01); *F04B 2201/1203* (2013.01); *F04B 2205/01* (2013.01); *F04B 2205/05* (2013.01); *F04B 2205/14* (2013.01)

(58) Field of Classification Search
None
See application file for complete search history.

(56) References Cited

U.S. PATENT DOCUMENTS

| 2002/0123856 A1 | 9/2002 | Eryurek |
| 2014/0039836 A1 | 2/2014 | Moricca et al. |
| 2015/0293505 A1* | 10/2015 | Acosta Gonzalez ... F04D 27/00 700/29 |
| 2016/0231737 A1* | 8/2016 | Drumm ............ G05B 19/41885 |
| 2017/0184429 A1 | 6/2017 | Kallesøe |
| 2017/0268517 A1 | 9/2017 | Mangutov et al. |

FOREIGN PATENT DOCUMENTS

WO    2018165352 A1    9/2018

OTHER PUBLICATIONS

PCT International Search Report and Written Opinion of International Searching Authority dated Feb. 27, 2019 corresponding to PCT International Application No. PCT/US2018/063592 filed Dec. 3, 2018.

\* cited by examiner

*Primary Examiner* — Mohammad Ali
*Assistant Examiner* — Saad M Kabir

(57) ABSTRACT

A method and controller for creating a digital twin of a pump. The method includes receiving, by a controller, a specification curve corresponding to a centrifugal pump. The method includes building and executing, by the controller, a first model of the centrifugal pump, based on the specification curve. The method includes receiving sensor data corresponding to and during the operation of the pump. The method includes updating the first model according to the sensor data to produce an updated model, and storing the updated model as a digital twin of the centrifugal pump.

16 Claims, 8 Drawing Sheets

DIGITAL TWIN OF CENTRIFUGAL PUMP IN PUMPING SYSTEMS

CROSS-REFERENCE TO OTHER APPLICATION

This application shares some subject matter with commonly-assigned, concurrently filed PCT Patent Application PCT/US2017/067621 for "Predictive Pump Station and Pipeline Advanced Control System", which is hereby incorporated by reference.

TECHNICAL FIELD

The present disclosure is directed, in general, to liquid pumping systems, including but not limited oil and gas and multiphasic pipeline pumping systems.

BACKGROUND OF THE DISCLOSURE

It can be difficult and expensive to operate pumping systems for transport of liquids of varying viscosities and other characteristics. Improved systems are desirable.

SUMMARY OF THE DISCLOSURE

Various disclosed embodiments include a method and controller for creating a digital twin of a pump. The method includes receiving, by a controller, one or more specification curves corresponding to a centrifugal pump. The method includes building and executing, by the controller, a first model of the centrifugal pump, based on the specification curves. The method includes receiving sensor data corresponding to and during the operation of the pump. The method includes updating the first model according to the sensor data to produce an updated model, and storing the updated model as a digital twin of the centrifugal pump. The model can be repeatedly updated as process conditions vary and over time as equipment wears.

In various embodiments, the method also includes operating the centrifugal pump and/or pump station according to the first model until the updated model is created and thereafter operating the centrifugal pump according to the latest updated model. In various embodiments, the method also includes executing the first model or the updated model. In various embodiments, the sensor data including but not limited to data from one or more of pressure sensors, flow rate sensors, density sensors, viscosity sensors associated with the centrifugal pump.

In various embodiments, the first model is created by receiving, by the controller, the specification curves as a input curves, taking samples of the input curves, defining an index number for each of the number of head-flow points, processing each head-flow point for an increase in flow, and creating a polynomial curve model of the centrifugal pump from the head-flow points, including generating head-flow curves. The polynomial curve model is used as the first model.

In various embodiments, the samples include head values and flow values for a plurality of pump revolutions-per-minute. Various embodiments further include validating the polynomial curve model by comparison to the input curve. In various embodiments, the method is performed by a programmable logic controller or is implemented by executing a function block programmed in Structured Control Language. Various embodiments further include animating at least one of the first model or the updated model according to changing flow and speed values.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
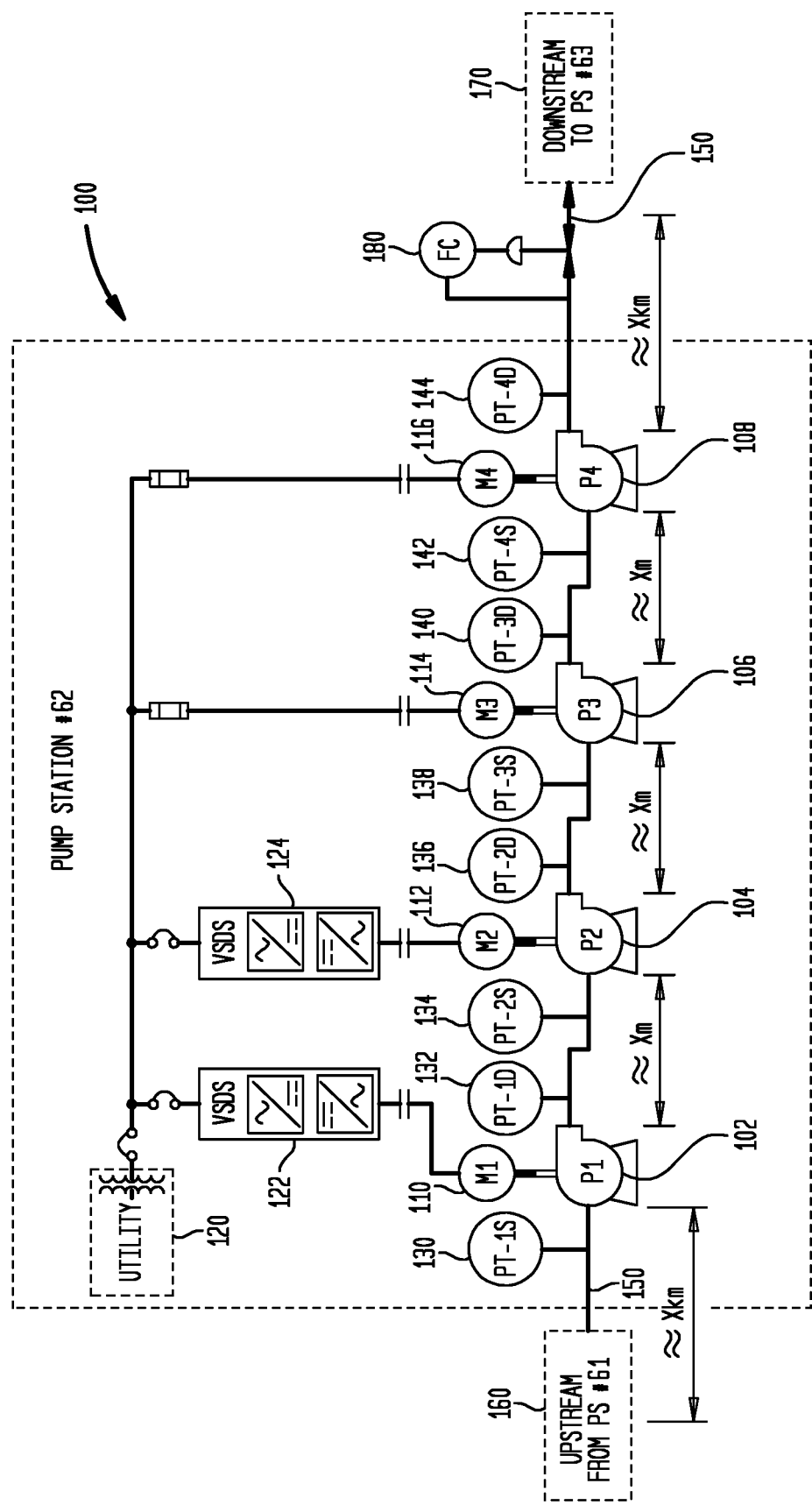
FIG. 1 illustrates an example pump station constructed in accordance with an exemplary embodiment of the present invention.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A large-scale liquid pumping system, such as an oil pipeline, typically will have a series of geographically-separated pumping stations along the pipeline that function to pump the liquid and keep it in transport between source and destination. The liquid being transferred may vary in type and characteristic over time. For example, the same pipeline is used to carry crude oil of different assays, such as crude oil that is heavy, light, sweet, or sour, as those terms are used in the field, or different oils such as diluted bitumen oil, or synthetic crude oil. Each type of oil or other liquid may have different viscosity, density, or other characteristics. Typical oil pipelines transport batches of different types of oil. Batches can be of different products and of different grades of the same product. Batch changes can occur frequently, as often as several times per day.

The pressure needed to pump the liquid changes based on the type or characteristics of the liquid, as does the energy needed to operate the pumps to achieve effective transport. In a pumping station, there can be multiple pumps. Some of those pumps may always operate at full power/capacity, while other variable-speed pumps are varied according to the liquid characteristics to ensure proper transport. In any of the pumps, the original nominal performance of the pump, such as specified by the manufacturer's specifications, can change with the liquids properties and degrade over time, so that operation based only on the original specifications leads to less-than-optimal results.

Manufacture pump curves typically describe performance for just water. They may or may not include curves for a viscous liquid. The ANSI/Hydraulic Institute standard 9.6.7-2015 "Rotodynamic Pumps—Guideline for Effect of Liquid Viscosity on Performance" provides methods and equations on how to adjust the water curves to determine a pump will perform for specific densities and viscosities other than water. When the pump wears and its performance degrades due to such things as cavitation, the ANSI/HI methods no longer work because the manufacturer curves reflect the performance of a brand new pump, not one that has worn out and only has, for example, 80% of its impeller left.

Disclosed embodiments implement a real-time simulation and modeling of pump operation and characteristics based on actual performance, so that the operating parameters of the pumps can be adjusted according to the current liquid characteristics and the current operating characteristics of the pump. In various embodiments, the modeling is performed by a programmable logic controller (PLC), avoiding the need for a large-scale simulation system. Disclosed embodiments can be applied to pump stations and pipelines that transport any "produced products" such as various grades of gasoline, jet fuel, diesel, etc., and are not limited to crude oil. Disclosed embodiments can be applied to any systems, and in particular those in which the liquid has properties that can change over time.

Currently, there is no effective means for dynamically simulating a centrifugal pump whose performance no longer follows manufacturer specification curves, such as by using a programmable logic controller at pump stations. There is no rapidly-deployable, low-cost real-time generic centrifugal pump simulation and parameter calculations for variable speed, variable viscosity, and variable density pumping applications where pump performance no longer follows manufacturer specification curves suitable for integration with standard automation solutions. There are processes for determining for pump pressure (pump "head") as a function of variables such as pump speed and pump flow. There is no centrifugal pump simulator "program block" that can model any centrifugal pump for viscous liquids, such as simulating pump head as a function of pump speed and flow.

FIG. 1 illustrates an example pump station constructed in accordance with an exemplary embodiment of the present invention.

The pump station 100 as illustrated in FIG. 1 models a four-pump-in-series-station with pumps 102, 104, 106, and 108, also labelled as P1, P2, P3, and P4, for transporting a liquid, for example oil, along pipeline 150. Many other media or liquids can be transported in the pipeline 150. Each pump 102, 104, 106, 108 is driven by an electric motor, which are for example induction motors. Pump 102 is driven by pump motor 110, also labelled M1, pump 104 is driven by pump motor 112 (M2), pump 106 is driven by pump motor 114 (M3), and pump 108 is driven by pump motor 116 (M4). For example, electrical power is supplied by power supply 120, also referred to as utility. Likewise, power supply can be by generator. If required, electrical transformers transform incoming voltage to appropriate levels for the pump motors 110, 112, 114, 116.

Pumps 102, 104, 106, 108 are each configured as a centrifugal pump. In this exemplary embodiment, the power for driving the pumps 102, 104, 106, 108 is provided directly by the electric pump motors 110, 112, 114, 116.

Pumps 102, 104 are powered each by a variable speed drive, also referred to as Variable Speed Drive System (VSDS). Pump 102 is powered by VSDS 122, and pump 104 is powered by VSDS 124. The variable speed drives 122, 124 are used to control speed and torque of pump motors 110, 112. In the exemplary embodiment according to FIG. 1, each VSDS 122, 124 is operated with a fixed speed set point. Pumps 106, 108 are operated at a constant speed powered from the utility 120. Optionally, the pump station 100 can be equipped with a flow controller 180.

Pumps 102 (P1) and 104 (P2), which are powered by VSDS 122 and 124, can be discharge pressure controlled using speeds of the motors 110 (M1) and 112 (M2). Thus, each pump 102, 104 comprises pressure sensors/transmitters 130, 132, 134, 136. Pressure transmitters 130, 132 monitor pressure head of pump 102, wherein pressure transmitter 130, also labelled as PT-1S, is arranged upstream of pump 102 and pressure transmitter 132, also labelled PT-1D, is arranged downstream of pump 102. Transmitter 132 is operably connected to VSDS 122 in order to control the discharge pressure of pump 102 using the speed of motor 110. As FIG. 1 shows, each further pump 104, 106, 108 comprises at least two pressure transmitters 134 (PT-2S), 136 (PT-2D), 138 (PT-3S), 140 (PT-3D), 142 (PT-4S), 144 (PT-4D), wherein one pressure transmitter is arranged upstream of the pumps 104, 106, 108 and one pressure transmitter is arranged downstream of the pumps 104, 106, 108. As described below, other sensors/transmitters can be associated with one or more of the pumps.

The four centrifugal pumps 102, 104, 106 and 108 of pump station 100 are arranged in series. One of ordinary skill in the art appreciates that pump station 100 can comprise more or less than four pumps, for example only one pump or ten pumps. When pump station 100 comprises more than one pump, the pumps can be arranged in series and/or in parallel and/or a combination of both.

The pump station 100 further comprises field devices to measure and monitor relevant data and manipulate operation. Such field devices comprise for example flow, pressure and temperature gauges, sensors, and transmitters. Pump station 100 can comprise pressure and temperature gauges and transmitters installed along the pipeline 150 on specific locations. A supervisory control and data acquisition system (SCADA) system, for example at a main control room, receives all the field data and presents the data to pipeline operators through a set of screens or other type of human-machine-interface, displaying the operational conditions of the pipeline. The operator can monitor the hydraulic conditions of the line, as well as send operational commands (open/close valves, turn on/off compressors or pumps, change set points, etc.) through the SCADA system to the field. Exemplary embodiments of the present invention integrate into such an operational environment, and, as described herein can be implemented using a PLC performing processes as disclosed herein.

The pump station 100 is labelled as pump station #62 and is part of a pump system. A pump system can comprise one ore pump stations, such as for example pump station 100 as illustrated in FIG. 1. As FIG. 1 shows, pump station 100 (#62) is connected between pump station 160 (#61) and pump station 170 (#63), wherein pump station 160 is located upstream of pump station 100 and pump station 170 is located downstream of pump station 100. Between the pump stations 100, 160 and 170 are distances of many kilometers. The distances between individual pump stations (X km) can vary, for example according to specific regional requirements. According to selected distances between pump stations, the number of individual pumps may need to be adjusted. For example, the longer the distance between pump stations, the more pumps at the pump station may be required in order to provide flow. Multiple pump stations, as for example pump stations 100, 160, 170, of a pump system can be arranged in series or parallel or in a combination of both. The pump stations 100, 160, 170 as schematically shown in FIG. 1 are arranged in series. Each pump of a pump system and/or each pump 102, 104, 106, 108 of a pump station such as pump station 100 can be either driven by a VSDS or can be powered directly by the utility 120, also referred to as direct online type (DOL). Each of the pumps 102, 104, 106, 108 can be operated on/off. When DOL operation of pumps 102, 104, 106, 108 is required, pumps 102, 104, 106, 108 are typically started using VSDs 122 and/or 124 to accelerate a pump to rated speed then transfer power to utility 120 after which VSDs 122 and/or 124 is/are disconnected from the pump and made available for use by the other pumps. Alternately, pumps 102, 104, 106, 108 can also be "across the line" started, with no accelerating with the VSD. Distances between individual pumps 102, 104, 106, 108 (X m) can be equal or can be different.

Disclosed embodiments can manage variable-speed pumps, such as pumps 102 (P1) and 104 (P2), which are powered by VSDS 122 and 124, using processes that implement equations for pump properties such as head:

$$head = \left(\frac{speed}{speed_{BEP}}\right)^2 f\left(\left(\frac{speed_{BEP}}{speed}\right)flow\right)$$

And speed as a function of head and flow speed=f(head, flow)
And flow as a function of speed and head flow=f(speed, head) and other functions.

In this equation, $speed_{BEP}$ is the reference speed constant at the pump's Best Efficiency Point and $$f\left(\left(\frac{speed_{BEP}}{speed}\right)flow\right)$$

is either a polynomial or cubic spline (or other suitable curve fit equation) whose coefficients are calculated by a system as disclosed herein based upon parameterized head-flow point pairs taken from the pump manufacturer's specification curves. These equations are modeled by the processes described in FIGS. 4, 5, and 6, and effectively simulates pump properties such as head for liquids such as water, and correction factors can be used to correct for viscous liquids.

Figure 2:
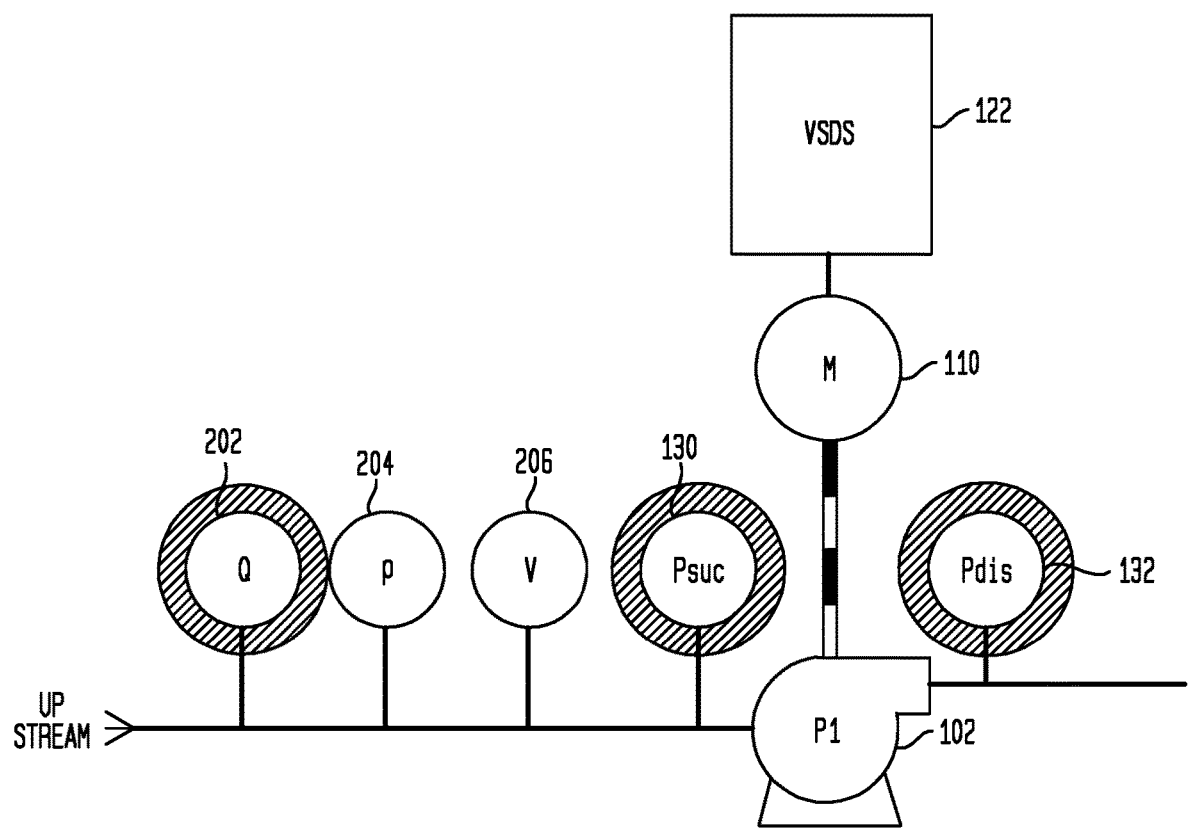
FIG. 2 illustrates additional elements associated with a pump in accordance with disclosed embodiments.

FIG. 2 illustrates additional elements associated with pumps 102 (P1), which is powered by VSDS 122 and motor 110 in accordance with disclosed embodiments. Note that this example of pump 102 and associated elements can be implemented using any or all of the pumps at a given station.

As above, pressure transmitters 130, 132 monitor pressure head of pump 102, wherein pressure sensor/transmitter 130, also labelled as $P_{suc}$, is arranged upstream of pump 102 and pressure sensor/transmitter 132, also labelled $P_{dis}$, is arranged downstream of pump 102. Additional sensor/transmitters, in accordance with disclosed embodiments, include a flow rate (Q) sensor 202, a density (ρ) sensor 204, and a viscosity (v) sensor 206, and other relevant sensors such as temperature sensors and others. Each of these factors are read repeatedly or continually to determine the characteristics of the liquid and its flow through the pump. These and other variables are used to analyze pump power and performance:

Ph: Hydraulic power of the pump (kW).
Ps: Shaft power of the pump (kW).
Pm: Required power to the Motor (kW).
Q, q: Volumetric flow of liquid through the pump (m³/h).
P: Density of the liquid being pumped (kg/m³).
g: Gravity (9.81 m/s²).
H, h: Head produced by the pump (m).
Pd: Differential pressure across the pump (kPa).
$\eta_p$: Pump efficiency (%).
$\eta_m$: Motor efficiency (%).
n: Rotational speed (RPM).

The efficiency of a pump can be calculated as $$Efficiency = \frac{Flow(Discharge\ Pressure - Suction\ Pressure)}{Applied\ Shaft\ Power} \text{ or}$$

$$\eta_p = \frac{Q(P_{dis} - P_{suc})}{P_s}$$

Efficiency is a function of flow rate, itself a function of RPM and pipeline system curves, and of viscosity.

Disclosed embodiments provide a "digital twin" of a pump (or twins of multiple pumps) that models the performance of the physical pump in a simulator or by a PLC. The digital twin can be used, in particular, to model the pump based on the actual performance characteristics of the pump, in combination with the characteristics of the liquid, to analyze and improve performance of the physical pump. The digital twin, and the system or device by which it is implemented, is generically referred to as the "system" herein.

Figure 3:
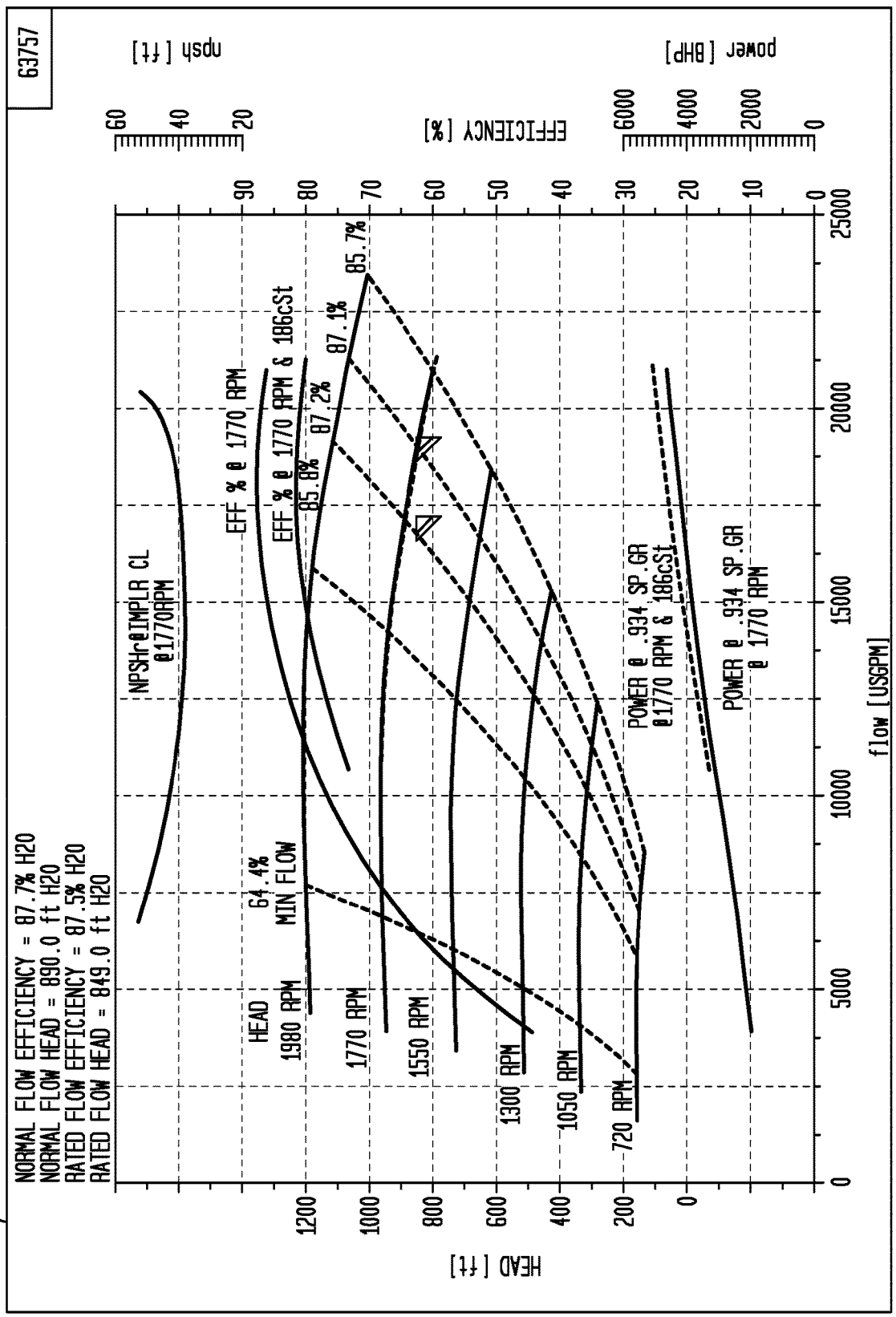
FIG. 3 illustrates an example of a manufacture's pump curves from a pump manufacturer's specifications.

FIG. 3 illustrates an example of a manufacture's pump curves 300 from a pump manufacturer's specifications, any of which can operate as the input or specification curves as describes herein. This figure shows head-flow for various RPM speeds, and pump efficiency-flow. Pump curves such as those shown in this example are used as a basis determining pump manufacturer characteristics as disclosed herein.

This particular example of manufacturer's curves correspond to a Sulzer pump model HSB 20×24×31 AZ Single Stage, curve number 63757, Revision A, pump number 359343, with impeller pattern 2013HSB-06 staggered.

Pump curves such as those shown in FIG. 3 are used to perform curve-fitting to model the pump. For example, a head-flow curve at 1770 RPM is used to extract the head-flow ordered pairs used by the algorithms to calculate coefficients for the curve fitting equations (but of course other curves could be used). Note that as pump speed is increased/decreased the curve maintains its general shape due the centrifugal pump Affinity Laws and shift up-and-right and down-and-left respectively. The performance curve is can be represented as a 3-dimensional surface.

Figure 4:
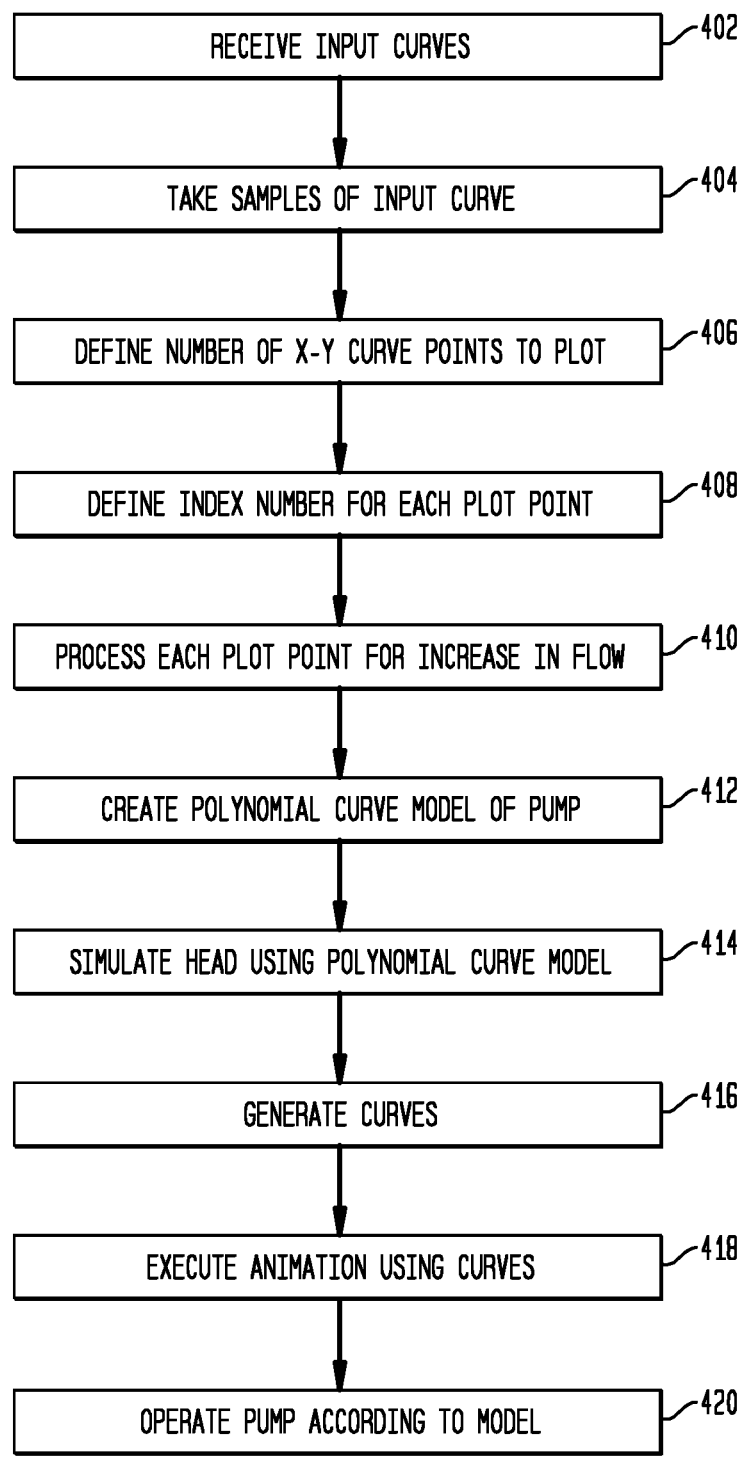
FIG. 4 illustrates a process as disclosed herein to create head-flow models to fit the performance curves.

FIG. 4 illustrates a process as disclosed herein to create head-flow models to fit the performance curves. One curve fitting approach is a cubic-spline function and the other is a $3^{rd}$ order polynomial. Both equations can be used for comparison purposes. While the cubic spline results are more accurate than the polynomial, the difference in values is negligible for the application and implementation of the polynomial is less complex and requires less programming. While specific examples below describe polynomial curve fitting, other curve-fitting approaches can be used within the scope of disclosed embodiments to find one or more curve-fitting equations. Similarly, the specific equations below describe one exemplary implementation, but other curve-fitting techniques and equations can be used.

The system receives an input curve (402). This can be one or more curves as illustrated in FIG. 3 or other curves that specify pump performance.

The system can use centrifugal pump affinity laws for changes in speed, where:

$$\frac{Q_2}{Q_1} = \frac{N_2}{N_1}$$

$$\frac{H_2}{H_1} = \left(\frac{N_2}{N_1}\right)^2$$

$$\frac{H_2}{H_1} = \left(\frac{Q_2}{Q_1}\right)^2$$

The system can take samples of a selected input curve (in this example, the 1770 RPM reference curve) for both flow (Q) and head (H) (404), for example:

$$Q_{splineSamples} := \begin{pmatrix} 3875 \\ 5000 \\ 7500 \\ 10000 \\ 12500 \\ 15000 \\ 17500 \\ 20000 \\ 21575 \end{pmatrix} \quad H_{splineSamples} := \begin{pmatrix} 878 \\ 882.3 \\ 894 \\ 900 \\ 890 \\ 870 \\ 835 \\ 780 \\ 740 \end{pmatrix}$$

$$Q_{cubicSamples} := \begin{pmatrix} 3875 \\ 10000 \\ 15000 \\ 21575 \end{pmatrix} \quad H_{cubicSamples} := \begin{pmatrix} 878 \\ 900 \\ 870 \\ 740 \end{pmatrix}$$

The system can then define the number of head-flow points, or other X-Y points on the curve, to plot for the cubic spline and polynomial simulated pumps (406). Disclosed embodiments are not limited to the head-flow curve, but can use any one or more input curves, each of which can be functions of one or many variables.

The system can set N:=20, for example, as the number of simulated pump performance curve points to plot.

The system can define an index number for each of the plot points, for example as n:=0 . . . (N−1) (408).

The system can process each increase in flow (increment) from one plot point to the next, such as (410):

$$q_{Inc} := \frac{\max(Q_{splineSamples}) - \min(Q_{splineSamples})}{N - 1}$$

The system can then create the curve model of the pump (412). In some embodiments, this is a polynomial curve model, but other curve models and curve-fitting techniques can be used. This can use cubic polynomial coefficients, such as:

$$cubic_{coef} := \begin{bmatrix} (Q_{cubicSamples_0})^3 & (Q_{cubicSamples_0})^2 & (Q_{cubicSamples_0})^1 \\ (Q_{cubicSamples_1})^3 & (Q_{cubicSamples_1})^2 & (Q_{cubicSamples_1})^1 \\ (Q_{cubicSamples_2})^3 & (Q_{cubicSamples_2})^2 & (Q_{cubicSamples_2})^1 \\ (Q_{cubicSamples_3})^3 & (Q_{cubicSamples_3})^2 & (Q_{cubicSamples_3})^1 \end{bmatrix}^{-1} \cdot H_{cubicSamples}$$

Exemplary cubic coefficients can be:

$$cubic_{coef} = \begin{pmatrix} -18.508825888303 \times 10^{-12} \\ -327.745224133137 \times 10^{-9} \\ 10.985322900272 \times 10^{-3} \\ 841.430119298895 \times 10^{0} \end{pmatrix}$$

The system can simulate the head using the curve model (414), such as:

$$H_{poly_n} := cubic_{coef_0} \cdot (Q_n)^3 + cubic_{coef_1} \cdot (Q_n)^2 + cubic_{coef_2} \cdot (Q_n) + cubic_{coef_3}$$

The system can use the affinity laws to generate head-flow curves (416), replicating those as shown in FIG. 3, or to produce head-flow curves according to sampled data, such as:

$$RPM := \begin{pmatrix} 1980 \\ 1550 \\ 1300 \\ 1050 \\ 720 \end{pmatrix}$$

-continued $$q_{ref} := Q_{splineSamples_7}$$

$$h_{ref} := H_{splineSamples_7}$$

$$H_{RPM_{s,n}} := h_n(\text{rpm}_{ref}, RPM_s, Hcs_n)$$

This step can include defining the index number for each of the RPM values, such as:

$$s := 0 \ldots \text{length}(RPM) - 1$$

This step can include defining a speed-flow matrix after applying affinity laws, such as:

$$Q_{RPM_{s,n}} := q(\text{rpm}_{ref}, RPM_s, Q_n)$$

This step can include defining a head-flow matrix after applying affinity laws, such as:

$$H_{RPM_{s,n}} := q(\text{rpm}_{ref}, RPM_s, Hcs_n)$$

The system can validate the generated curves by comparing them to the original curves, such as those shown in FIG. 3. Any of the curves, for example for different RPMs, can be generated and validated.

The simulated pump equations effectively allow the digital twin of the pump to be executed, where head is a function of flow and speed. The solution for created h(q,n) is elegant. The affinity laws state that flow changes proportionally to changes in speed; flow decrease with decreasing speed and increase with increasing speed. The affinity laws also state that head changes proportionally to the square of the speed ratio. Creating h(q,n) is performed by scaling the flow variable with the inverse of the speed ratio and scaling the result with the square of the speed ratio, such as:

$$\text{flow} := 15000$$

$$spd := 1300$$

$$\text{head}_{cs} :=$$

$$\left(\frac{spd}{RPM}\right)^2 \cdot \text{interp}\left[\text{cubicSpline}, Q_{splineSamples}, H_{splineSamples}, \left(\frac{RPM}{spd}\right) \cdot \text{flow}\right]$$

$$\text{headpoly}(\text{flow}, spd) := \left(\frac{spd}{RPM}\right)^2 \cdot \begin{bmatrix} \text{cubic}_{coef_0} \cdot \left[\left(\frac{RPM}{spd}\right) \cdot \text{flow}\right]^3 + \\ \text{cubic}_{coef_1} \cdot \left[\left(\frac{RPM}{spd}\right) \cdot \text{flow}\right]^2 + \\ \text{cubic}_{coef_2} \cdot \left[\left(\frac{RPM}{spd}\right) \cdot \text{flow}\right] + \text{cubic}_{coef_3} \end{bmatrix}$$

In various embodiments, the "digital twin" simulation can be implemented as a function block programmed in Structured Control Language (SCL), and can be implemented on a PLC, though other languages and hardware implementations can be used in other embodiments. Such a function block is portable and easily modified as required to run on different CPU families and used in different programming environments.

During initialization all outputs can be defaulted and the curve fitting polynomial (or cubic spline) coefficients can be calculated for the head vs flow curve, the efficiency vs flow curve, the net positive suction head curve, and the brake horse power curve.

Because the processes for calculating output values are computationally efficient, the function can be called every controller cycle or as rapidly or slowly as the application needs, such as in a cyclic interrupt block. The function can also be executed immediately (such as an interrupt) should process conditions (such as a fault) dictate immediate execution.

The system can animate changing flow and speed values using the head-flow curves (418). Such an animation can show the head as a function of flow and speed. Minimum and maximum flow values from each speed are taken from the reference samples at a selected RPM.

The system can then operate the pump(s) according to the model(s) (420).

To create actual performance curves according to sensor data, the system can use a process as described above. In addition, the system can collect the actual process data from the sensors describes above and create multiple three-dimensional (3D) matrices, one for train power, one for train efficiency and one for train head. The system can do so for both DOL pumps and VSD pumps.

Figure 5:
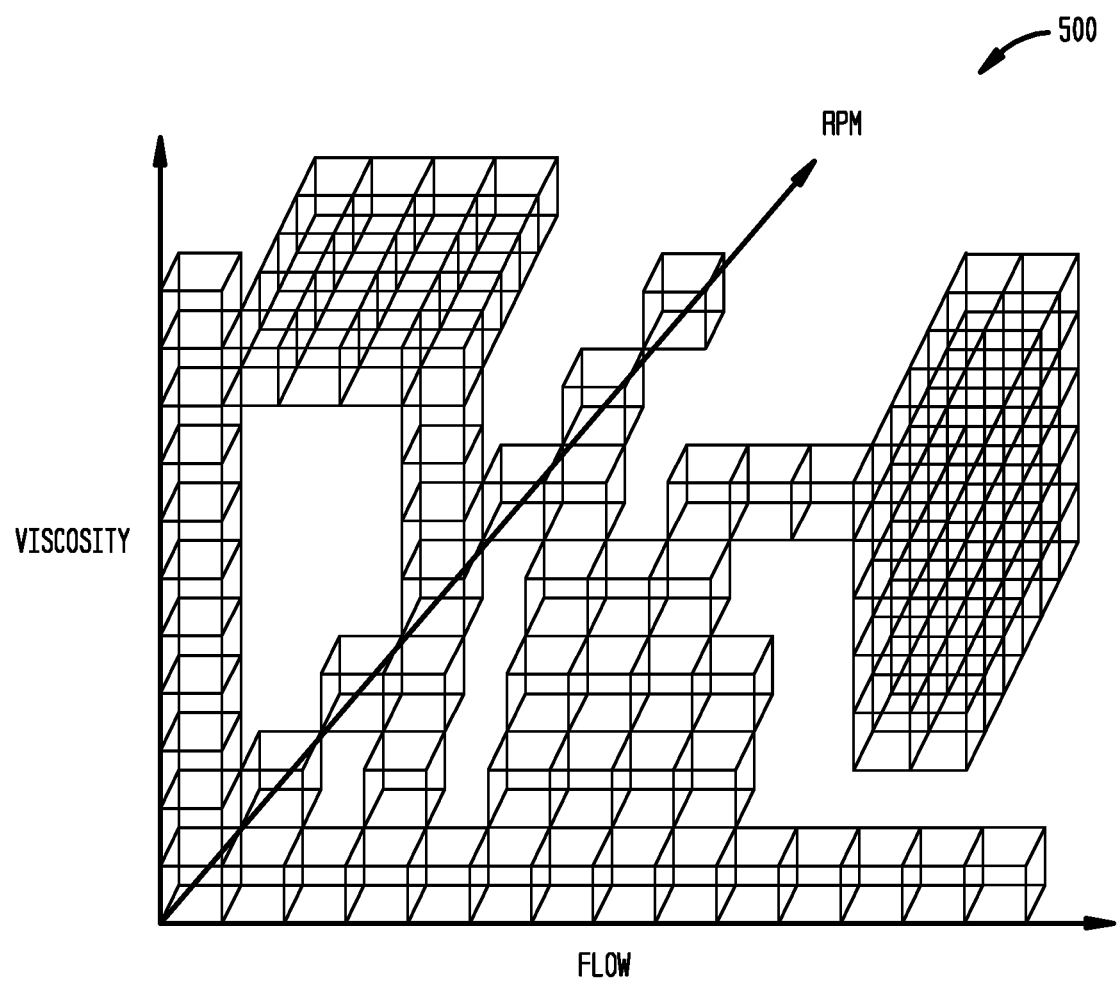
FIG. 5 illustrates an example of a three-dimensional matrix in accordance with disclosed embodiments.

FIG. 5 illustrates an example of such a 3D matrix 500.

Figure 6:
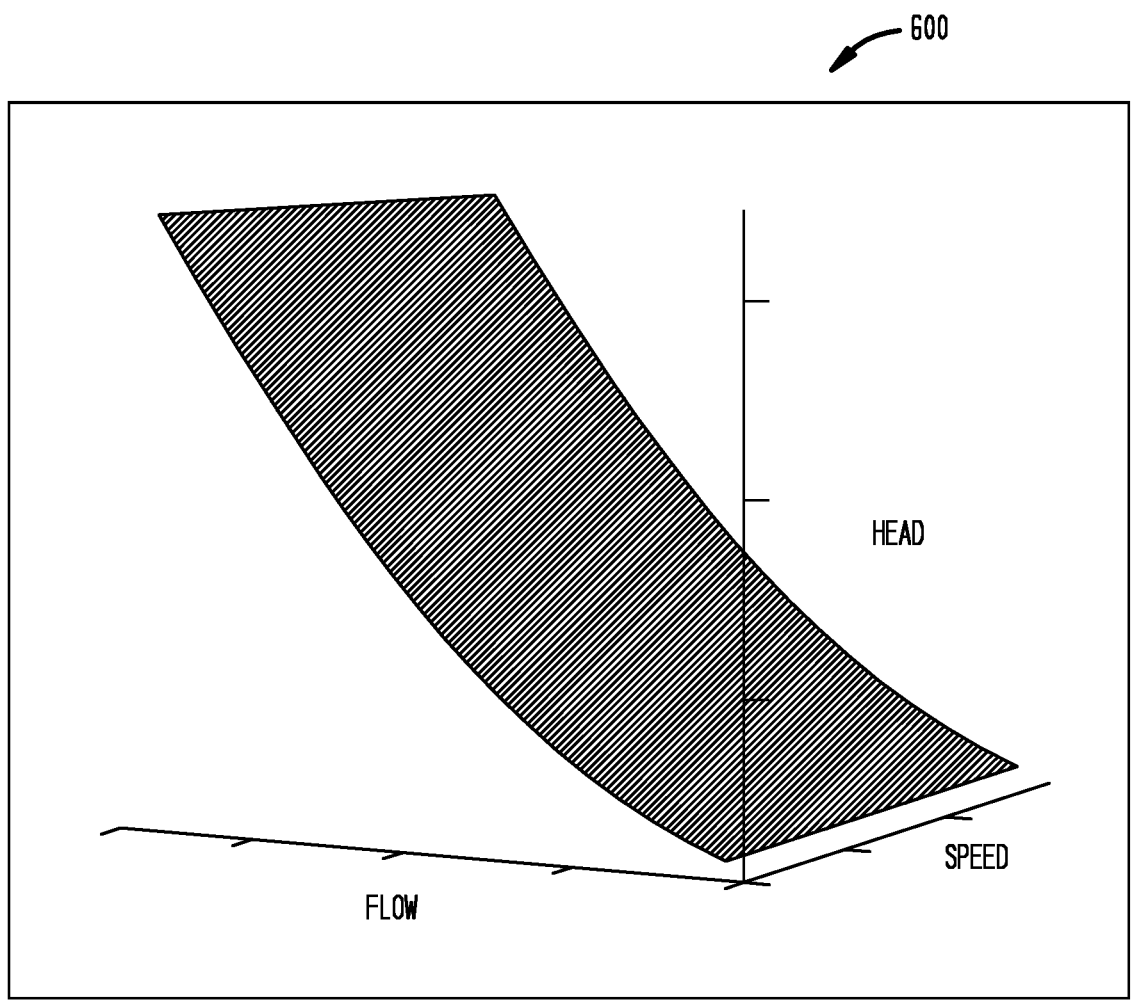
FIG. 6 illustrates an example of a 3D graph in accordance with disclosed embodiments.

The system can continue to collect sensor data during operation to create updated surface plots of flow, head, and speed. FIG. 6 illustrates an example of such a 3D graph 600.

To create revised manufacturer performance curves according to sensor data, the system can use a process similar to those as described above. The system can then apply the ANSI/Hydraulic Institute 9.6.7-2015 equations and methodology in a reverse fashion, in combination with the Affinity Laws as viscous-to-water normalizing equations using the actual sensor data to adjust the parametric equations, as described above, of the manufacture curves. Similar techniques can be used to reproduce the original manufacturer performance curves should they be unavailable, and can be used to reproduce any curves related to the pump operation.

Figure 7:
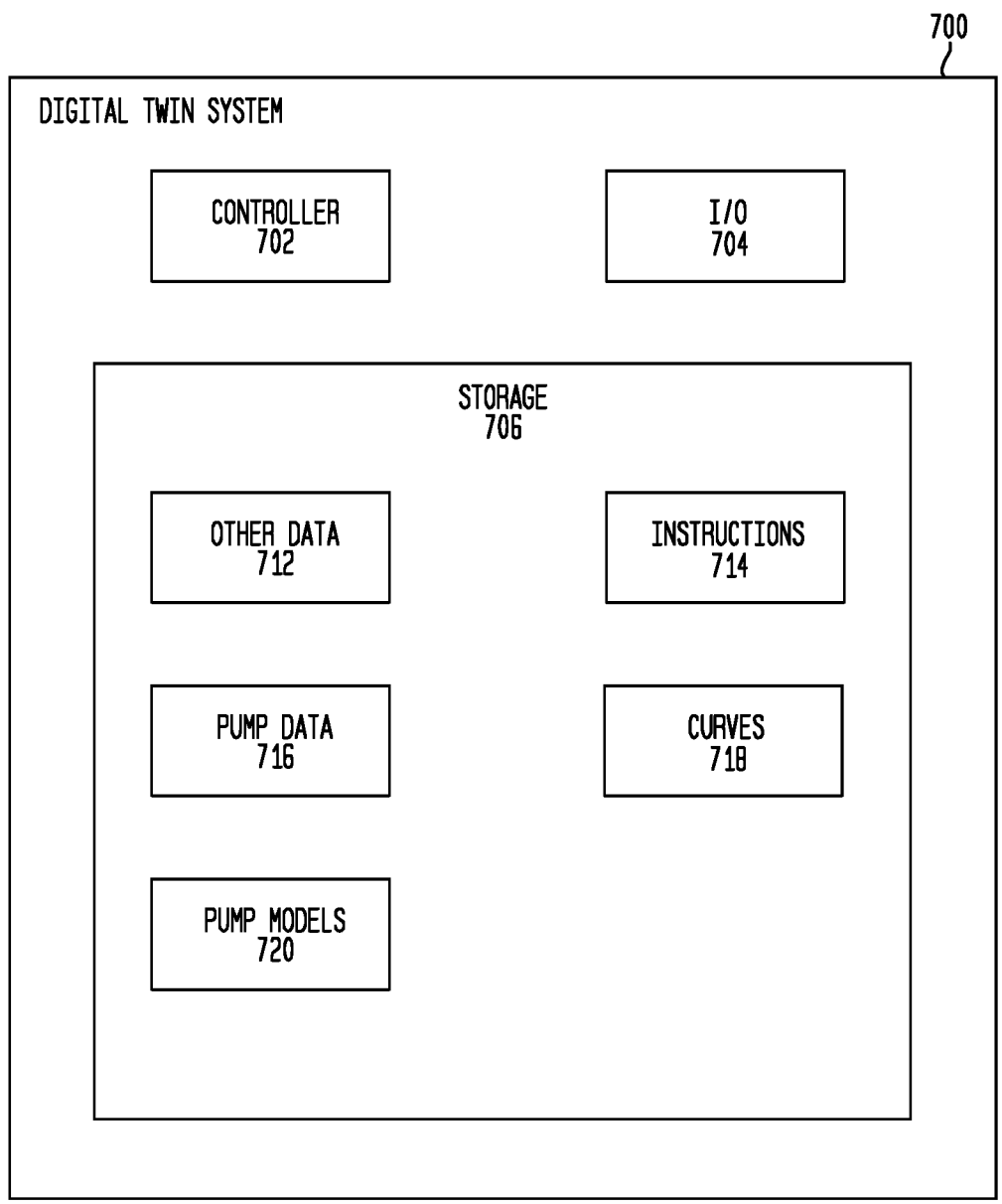
FIG. 7 illustrates a block diagram of a digital twin system in accordance with disclosed embodiments.

FIG. 7 illustrates a block diagram of a digital twin system 700 in accordance with disclosed embodiments. In specific embodiments, the digital twin system 700 is implemented using one or more PLCs. In other embodiments, the digital twin system 700 can be implemented as a cloud application and results sent back to the pump station. Similarly, calculations and models performed at the pump station can be sent to cloud applications for further optimization calculations.

Digital twin system 700 includes a controller 702 and an input/output (I/O) unit 704. I/O unit 704 can include any necessary hardware to communicate with other devices, including physical connections, network interfaces (wired and/or wireless), display outputs, HMI inputs and outputs, and other devices, or appropriate connections to communicate with any such external devices to perform processes as disclosed herein, and in particular to communicate with, monitor, and control devices of a pump station 100 as described herein.

Digital twin system 700 also includes a storage 706 that can include any combination of transitory and non-transitory computer-readable media, including but not limited to random-access memories (RAMs) or nonvolatile, hard-coded type mediums such as read only memories (ROMs) or erasable, electrically programmable read only memories (EEPROMs) or any other known storage or memory device. This can include external devices such as magnetic tape storage, and user-recordable type mediums such as floppy disks, hard disk drives and compact disk read only memories (CD-ROMs) or digital versatile disks (DVDs), and other known optical, electrical, or magnetic storage devices. Storage 706 can also include Internet of Things (IoT) and Cloud storage services.

The storage 706 can include executable instructions 714 to perform any of the processes as described herein or to otherwise monitor and control devices of a pump station 100 as described herein. These instructions, when executed, cause the digital twin system to perform the processes or specific actions described herein. Storage 706 can also include pump data 716, which can include any data for the various pumps, such as specification data, current or historical operation data, predictive data, or other data for one or more of the pumps. Storage 706 can also include curves 718, which can include any of the manufacturer-specified or generated curves as discussed herein. Storage 706 can also include other data 712, which generally includes any other data useful for performing processes as described herein or otherwise monitor, communicate with, and control devices of a pump station 100 as described herein, including any sensor data. Storage 706 can also include pump models 720, which can be a digital twin model of any pump as discussed herein, including the first model and updated model.

Figure 8:
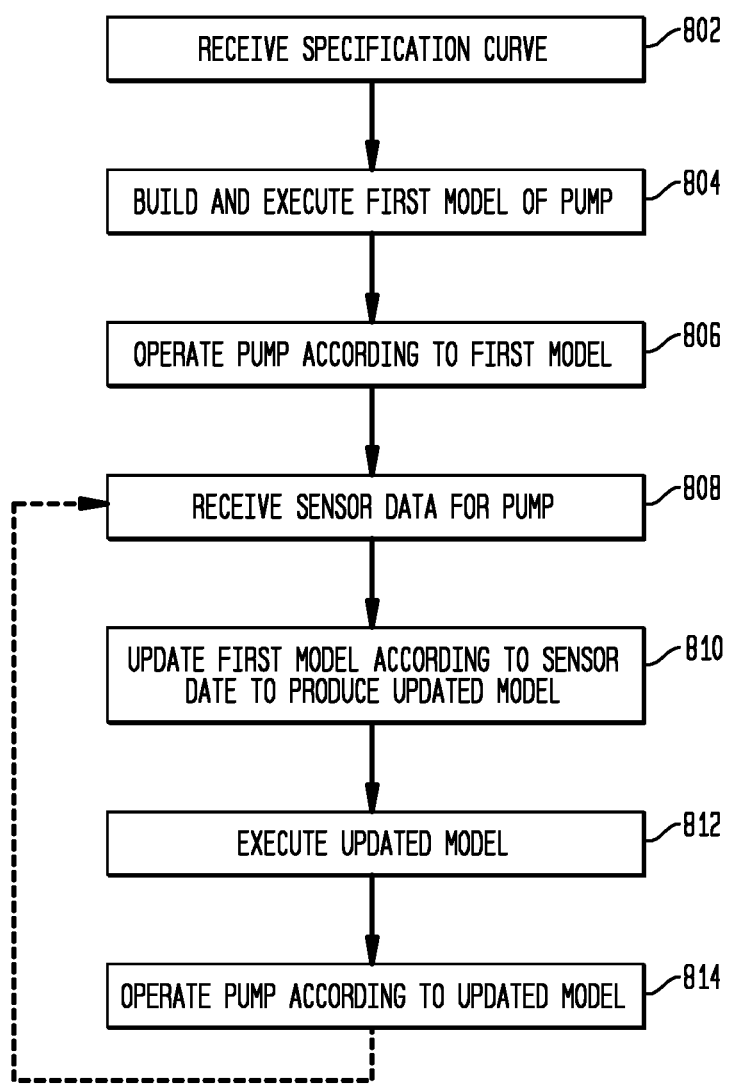
FIG. 8 illustrates a process in accordance with disclosed embodiments.

FIG. 8 illustrates a process in accordance with disclosed embodiments that can be performed by a digital twin system as disclosed herein.

The system receives a specification curve for a pump (802). The specification curve can be performance curves as discussed above that are defined by a manufacturer of the pump, and can correspond to the "input curve" in the process of FIG. 4. The specification curve can be any other input curve corresponding to the expected or actual performance of the pump. The pump can be a centrifugal pump as described above. While this process is described in terms of a single specification curve, those of skill in the art will recognize that any number of specification curves can be similarly processed to create a more refined model of the pump.

The system builds and executes a first model of the pump based on the specification curve (804). This can be performed according to the process of FIG. 4, and can be built based on both the specification curve and any other curves processed as described herein.

The system operates the pump according to the first model (806).

The system receives sensor data for the pump as it operates (808). This can include any of the data from the pressure sensors, flow rate sensors, temperature sensors, density sensors, viscosity sensors, or other sensors discussed above or used in conjunction with the pump station. This can include initial sensor data, as when the process is executed for the first time, and any subsequent sensor data received in The system updates the first model according to the sensor data to produce an updated model (810). This can include adjusting any of the curves discussed above to match the actual sensor data that corresponds to the pump, so that the updated model accurately reflects the pump performance and accounts for any difference in performance, either instantaneously or over time, from the specification curves. The updated model can be stored as a "digital twin" of the pump as part of this step, and such an updated model can be continuously or repeatedly updated.

The system executes the updated model (812). The updated model acts as a digital twin to the pump in its current operating condition as opposed to its original manufacturer-specification condition.

The system operates the pump according to the updated model (814). This allows the system to operate both the pump (and other elements of the pump station) and the pump station as a whole most efficiently according to the actual operating condition of the pump as modeled by the updated model. For example, a four-pump station will operate at different times with only two pumps, only three, or all four.

Disclosed embodiments improve operation of the pump station by selecting the pump trains that are most efficient for the operation. For example, if the station is running pumps 2 and 3, pump 3 is the least efficient, and pump 1 is the most efficient, the system will shut down pump 3 and start up pump 1.

The process can repeat, such as back to 808, to continually or repeatedly receive additional sensor data (808), update the model (810, where instead of updating the first model, the most recent updated model is further updated), execute the further-updated model (812), and operate the pump and pump station according to the further-updated model (814).

Disclosed embodiments solve significant technical problems caused when actual pump performance does not match the manufacturer specifications for a new pump. Disclosed embodiments provide a cost-effective means of monitoring and alerting when pump efficiency and performance deviates from manufacturers specifications to schedule maintenance or replacement, and provide a convenient and cost-effective way to monitor pump efficiency and other performance parameters. Disclosed embodiments can collect and apply historical data of pump performance to improve performance and so that manufacturers can improve pump designs. Disclosed embodiments implement an easy-to-configure pump monitoring and performance system within the automation system, and in particular within one or more PLCs, and can be implemented in the same automation system used to control and operate the plant/station.

Other systems, by contrast, do not perform as disclosed herein. For example, they do no take liquid viscosity into account, do not apply API/Hydraulic Institute correction factors for effects of viscous liquids on pump performance, do not allow for dynamic changes in density, do not recalculate in real-time (i.e. every controller scan cycle), and do not estimate pump output viscosity (viscosity changes due to increased discharge temperature due to pumping). These issues cause a significant problem for effective pumping of various liquids, and these problems are solved by the disclosed techniques.

Using disclosed techniques, pumping station operators can compare manufacturers predicted pump performance to actual pump performance (head, efficiency, power). The data produced by process as disclosed herein can be used to flag "failing" and "poor performing" pumps for maintenance or replacement, and can be used to predict future operating costs for shipping various grades of crude oil at different flow rates and pressures. Disclosed embodiments incorporate API/Hydraulic Institute correction factors for viscous effects on head, efficiency and power.

Using disclosed techniques, systems such as crude oil pipeline automation control systems can run real-time high-fidelity simulations of the customers equipment and process, in the same controller as the actual process control system, in order to support batch change and optimization. Disclosed processes can be used as an integral part of pipeline flow and pressure regulation control loops to implement advance process controls to improve flow and pressure regulation, decrease flow and pressure transients, reduce mechanical stresses on piping, joints, valves, pumps, etc., and decrease system response times and improved upset recovery (due to pumps or pump stations tripping off line).

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all systems suitable for use with the present disclosure is not being depicted or described herein. Instead, only so much of a data processing system as is unique to the present disclosure or necessary for an understanding of the present disclosure is depicted and described. The remainder of the construction and operation of the systems and devices disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method, comprising:
   receiving, by a controller, a specification curve corresponding to a centrifugal pump;
   building and executing, by the controller, a first model of the centrifugal pump, based on the specification curve;
   receiving sensor data corresponding to and during the operation of the centrifugal pump;
   coupling a viscosity sensor to the centrifugal pump, data from the viscosity sensor processed every scan cycle of the controller to account every said scan cycle of the controller for a varying viscosity of a liquid flowing through the centrifugal pump;
   updating the first model according to the sensor data to produce an updated model, and storing the updated model as a digital twin of the centrifugal pump; and
   operating the centrifugal pump according to the updated model,
   wherein the first model is created by a curve-fitting technique comprising a spline or a polynomial function programmed in the controller, the curve-fitting technique comprising:
      receiving, by the controller, the specification curve as an input curve;
      taking samples of the input curve, wherein the samples include head values and flow values for a plurality of pump revolutions-per-minute;
      defining a number of points of the input curve to plot, wherein the points are the head-flow points;
      defining an index number for each of the number of points;
      processing each point for an increase in flow; and
      creating a curve model of the centrifugal pump from head-flow points, including generating curves, wherein the curve model is used as the first model, and wherein the generated curves are head-flow curves.

2. The method of claim 1, further comprising:
   operating the centrifugal pump according to the first model until the updated model is created; and thereafter operating the centrifugal pump according to the updated model.

3. The method of claim 1, further comprising executing the first model or the updated model.

4. The method of claim 1, wherein the sensor data further includes data from one or more of pressure sensors, flow rate sensors, temperature sensors and density sensors associated with the centrifugal pump.

5. The method of claim 1, further comprising validating the curve model by comparison to the input curve, and wherein the curve model is a polynomial curve model.

6. The method of claim 1, wherein the method is performed by a programmable logic controller and the method is implemented by executing a function block programmed in Structured Control Language.

7. The method of claim 1, further comprising repeatedly receiving the sensor data, further updating the updated model, and executing the updated model.

8. The method of claim 1, further comprising animating at least one of the first model or the updated model according to changing flow and speed values.

9. A digital twin system, comprising:
   a memory,
   a viscosity sensor coupled to a centrifugal pump, and
   a controller in communication with the memory, the controller configured to:
      receive a specification curve corresponding to the centrifugal pump;
      build and execute a first model of the centrifugal pump, based on the specification curve;
      receive sensor data corresponding to and during the operation of the centrifugal pump;
      data from the viscosity sensor processed every scan cycle of the controller to account every said scan cycle of the controller for a varying viscosity of a liquid flowing through the centrifugal pump;
      update the first model according to the sensor data to produce an updated model, and store the updated model as a digital twin of the centrifugal pump; and
      operate the centrifugal pump according to the updated model,
   wherein the first model is created by a curve-fitting technique comprising a spline or a polynomial function programmed in the controller, the curve-fitting technique comprising:

receiving, by the controller, the specification curve as an input curve;

taking samples of the input curve, wherein the samples include head values and flow values for a plurality of pump revolutions-per-minute;

defining a number of points of the input curve to plot, wherein the points are the head-flow points;

defining an index number for each of the number of points;

processing each point for an increase in flow; and creating a curve model of the centrifugal pump from head-flow points, including generating curves, wherein the curve model is used as the first model, and wherein the generated curves are head-flow curves.

10. The digital twin system of claim 9, wherein the controller is further configured to:

operate the centrifugal pump according to the first model until the updated model is created; and thereafter operate the centrifugal pump according to the updated model.

11. The digital twin system of claim 9, wherein the controller is further configured to the first model or the updated model.

12. The digital twin system of claim 9, wherein the sensor data further includes data from one or more of pressure sensors, flow rate sensors, temperature sensors and density sensors associated with the centrifugal pump.

13. The digital twin system of claim 9, wherein the controller is further configured to validate the curve model by comparison to the input curve, and wherein the curve model is a polynomial curve model.

14. The digital twin system of claim 9, wherein the controller is a programmable logic controller and the controller is configured by executing a function block programmed in Structured Control Language.

15. The digital twin system of claim 9, wherein the controller is configured to repeatedly receive the sensor data, further update the updated model, and execute the updated model.

16. The digital twin system of claim 9, wherein the controller is further configured to at least one of the first model or the updated model according to changing flow and speed values.

* * * * *